Sept. 18, 1928.
O. LARSEN
1,684,834
DEAERATING APPARATUS
Filed July 9, 1926
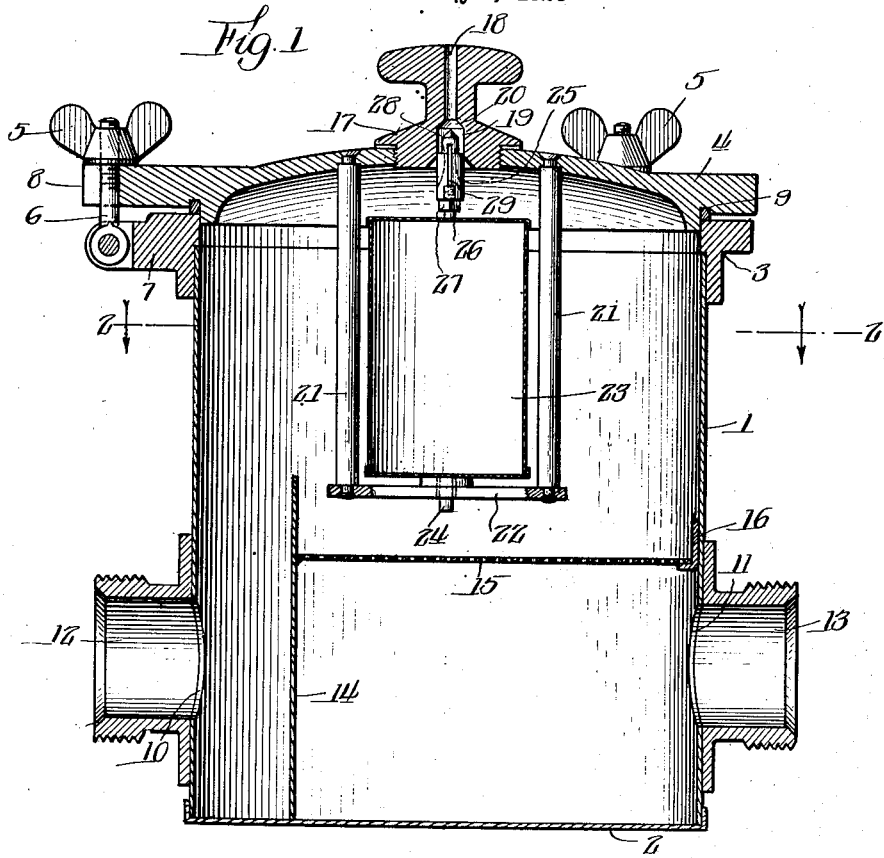
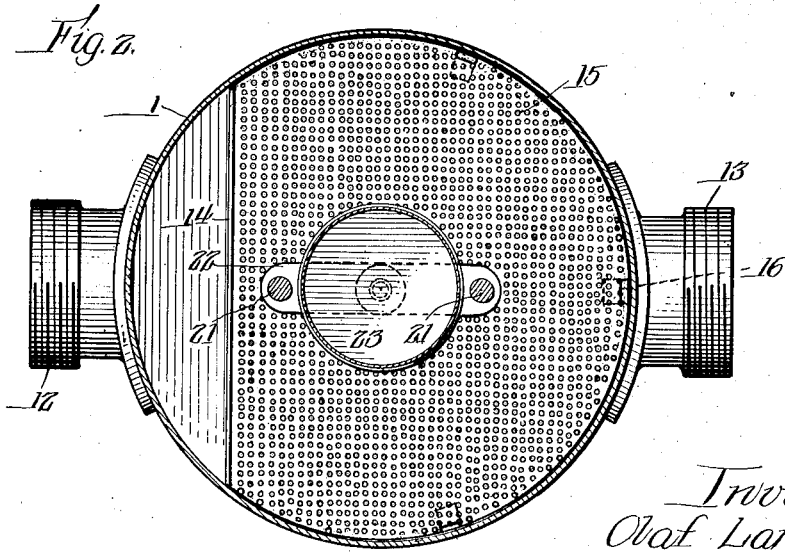
Inventor
Olaf Larsen
By Hewett S Dixon atty.

Patented Sept. 18, 1928.

1,684,834

UNITED STATES PATENT OFFICE.

OLAF LARSEN, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

DEAERATING APPARATUS.

Application filed July 9, 1926. Serial No. 121,292.

The invention relates particularly to deaerating devices adapted to use in removing the air entrapped in flowing milk and similar fluids.

In the preparation of milk for food consumption the practice in dairy plants requires the movement of the milk through several stages of treatment, principally by pumping from one receptable to another through suitable piping, and in this movement more or less air is incorporated with the milk. The effect of such air incorporation greatly increases the tendency for froth to develop wherever the milk is temporarily at rest or in an open receptacle. The froth is objectionable as interfering with the effectiveness of the treatment to which the milk is subjected, particularly in the Pasteurization treatment.

It is the principal object of this invention to provide a device which will separate the air from the liquid milk in a flowing stream, and to collect the air so separated and discharge it from the device. Another object is to provide such a device suitably designed for connection into the line of piping through which the milk is ordinarily conducted from one step to another in its treatment, and which is constructed so that it may be readily disassembled for cleaning and sterilization after use.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claims.

Referring to the drawings Fig. 1 is a sectional elevation of the device and Fig. 2 is a sectional plan view taken on the plane of the line 2—2 in Fig. 1. In the drawings the numeral 1 indicates the side wall of a container, of which the bottom wall is indicated at 2. A cover supporting ring 3 is mounted on the upper margin of the side wall 1, which carries a removable cover plate 4 secured thereto preferably by means of thumb nuts 5 and eye bolts 6 pivoted upon lugs 7 formed on the ring 3 and swinging into suitable slots 8 formed in the cover, permitting the tightening of the nuts upon the cover. A packing ring 9 may be provided to seal the joint between the cover and its supporting ring.

Inlet and outlet openings for the flow of the milk or similar liquid through the container are provided in its lower portion. As illustrated herein, an inlet opening 10 is provided in the side wall 1 and an oppositely positioned outlet opening 11 is also provided in the side wall, each of said openings being in register with a flanged nipple 12 and 13 suitably secured to the outer surface of the side wall 1 and adapted for the attachment of sanitary piping. If desired the outlet opening may be located in the bottom of the container.

Spaced inwardly of the container side wall from the inlet opening 10 is an imperforate partition plate 14, in substantially upright position and extending somewhat above the inlet opening 10. A screen 15, preferably arranged in approximately horizontal position, extends from the partition plate 14 to the side wall 1 of the container, and fully occupies the space therebetween except the space between the partition and the side wall adjacent to the inlet. The screen 15 is positioned above the outlet opening 11, and is preferably secured to the partition 14 somewhat below the upper margin of the latter, being oppositely supported by marginal lugs secured to the side wall of the container of which one is indicated at 16. For the purpose of easily removing the screen and partition, the two parts are made self-sustaining and removably fitted within the container so that they may be taken out and the container and parts thoroughly cleaned after use.

Positioned in the cover 4, over the upper portion of the container, is a removable plug 17, screw-threaded into the cover in sealed relation thereto and having an axial bore 18 extending therethrough and communicating with the interior of the container. The bore 18 is enlarged at its lower end as at 19, forming a tapered shoulder 20 intermediately of the ends of the bore. Suspended from the cover within the container are a pair of standards 21 carrying a cross bar 22 at their lower ends. A float 23, positioned between the standards 21, is operatively supported at its lower end by a pin 24 secured to the float and extending through a guide opening in the cross bar 22.

The upper end of the float 23 carries a valve 25 adjustably mounted on a pin 26 secured to the float and having an adjusting nut 27 threaded on the pin and abutting the lower end of the valve 25. The valve 25 protrudes with a sliding fit into the enlarged portion 19 of the bore 18, and has an extension 28 of reduced diameter formed with a conical extremity adapted to be seated, by the lifting of the float, upon the shoulder 20 to close the bore 18. Lateral slots 29 are provided in the valve 25 to afford communication through the bore past the full dimensioned portion of the valve 25.

In operation, the milk flows through the inlet opening 10, striking the partition 14 and losing its velocity in the chamber formed about the inlet by the partition. The milk, flowing gently over the top of the partition, is spread out over the screen 15 and thereby retarded with the effect of creating a shallow pool of the milk over the entire area of the screen. The milk flows through the screen 15 into the space therebelow and outwardly through the outlet opening 11. In its flow over the partition and its comparatively slow movement over the screen the air carried thereby rises from the liquid and is released into the upper portion of the container, the air escaping as collected through the bore 18, while the float 23 and the controlling valve 25 carried thereby are in lowermost position. It is designed that the normal flow of the milk will not rise sufficiently high in the container to lift the float, and that the air will be continuously separated from the milk and expelled from the container as described. If, however, there is a stoppage in the discharge of the milk in the line leading from the outlet opening, the rising level of liquid in the container effects the lifting of the float 23 and closes the air outlet bore 18, thus preventing the wastage of the milk through the air outlet.

After use, the cover of the container may be readily removed, carrying with it the float and valve structure, and by the removal of the plug 17 the latter structure may be separated, thus permitting ready disassembling of these parts for cleaning and sterilizing, the screen and partition being also removable to permit the thorough cleaning of the container and those parts.

I claim as my invention:

1. Apparatus for deaerating milk, comprising a container having an inlet opening and an outlet opening in its lower portion and having an air outlet in its upper portion, an imperforate partition in the lower portion of said container having marginal contact with the bottom and side walls thereof and defining with said walls an upwardly opening space communicating with said inlet opening, and a screen positioned intermediately of said container and extending laterally from said partition into contact with the side walls of said container to form therewith a chamber communicating with said outlet opening, said partition and said screen being freely removable through the upper portion of said container.

2. Apparatus for deaerating milk, comprising an upwardly open container having an inlet opening and an outlet opening in the lower portion thereof, a readily removable closure for the upper opening of said container, said closure having a float-valve-controlled air outlet, and a unitary structure interposed between said inlet and outlet openings in the lower portion of said container, said unitary structure having a substantially vertical imperforate partition member defining with the walls of said container an upwardly opening space communicating with said inlet opening, and having a substantially horizontal screen member defining with said partition member and the walls of said container a chamber communicating with said outlet opening, said unitary structure being freely removable from said container.

3. Apparatus for deaerating milk, comprising an upwardly opening container having an inlet opening and an outlet opening in its lower portion, a removable cover effecting a closure of said container, said cover having an air outlet therethrough, a valve controlling said air outlet, a bracket suspended from said cover, a float operatively supported on said bracket and operatively connected with said valve, a substantially vertical imperforate partition member positioned in the lower portion of said container and contact in the side and bottom walls thereof to form an upwardly opening lateral chamber in said container communicating with said inlet opening, said partition member forming also a substantially larger laterally opposite chamber communicating with said outlet opening, and a substantially horizontal screen extending laterally from said partition member to the side walls of said container and effecting a perforate closure of the chamber communicating with said outlet opening, said partition member and screen member being readily removable from said container.

In witness whereof I have hereunto attached my signature.

OLAF LARSEN.